Figure 3:
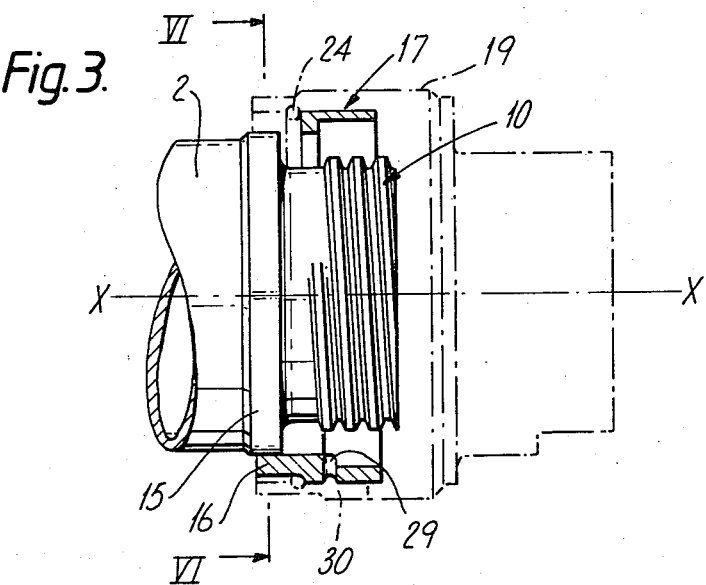

United States Patent [19]

Holmes

[11] 4,344,305

[45] Aug. 17, 1982

[54] TORQUE SHAFT COUPLING

[75] Inventor: Frederick H. Holmes, Blackpool, England

[73] Assignee: British Aerospace, Weybridge, England

[21] Appl. No.: 130,338

[22] Filed: Mar. 14, 1980

[30] Foreign Application Priority Data

Mar. 22, 1979 [GB] United Kingdom ................. 7910091

[51] Int. Cl.³ ............................................... F16D 3/06
[52] U.S. Cl. .................................... 464/169; 403/325; 403/359
[58] Field of Search ............................ 64/23, 1 C, 1 S; 403/317, 320, 325, 359

[56] References Cited

U.S. PATENT DOCUMENTS

| | | | |
|---|---|---|---|
| 2,728,895 | 12/1955 | Quackenbush et al. | 403/325 |
| 3,220,217 | 11/1965 | Kravits | 64/23 |
| 3,678,439 | 7/1972 | Vetter | 403/325 |
| 4,006,993 | 2/1977 | Woerlee | 403/359 |
| 4,033,146 | 7/1977 | Kuramochi et al. | 64/23 |
| 4,112,710 | 9/1978 | Okunda et al. | 64/23 |
| 4,192,155 | 3/1980 | Gray | 64/23 |

Primary Examiner—P. S. Lall
Attorney, Agent, or Firm—Cushman, Darby & Cushman

[57] ABSTRACT

A coupling for two co-axial torque transmitting shafts having the features of a splined torque transmitting joint (5, 6), a screwed joint (9, 10) for effecting axial engagement of the splined joint, interference members (15, 16) axially movable to a locked position in which unscrewing of the screwed joint is prevented, and a detent (32, 33) for preventing axial movement of the interference members from the locked position, the whole being housed in a readily hand grippable housing 19, hand movement of which effects sequential operation of all the features.

8 Claims, 9 Drawing Figures

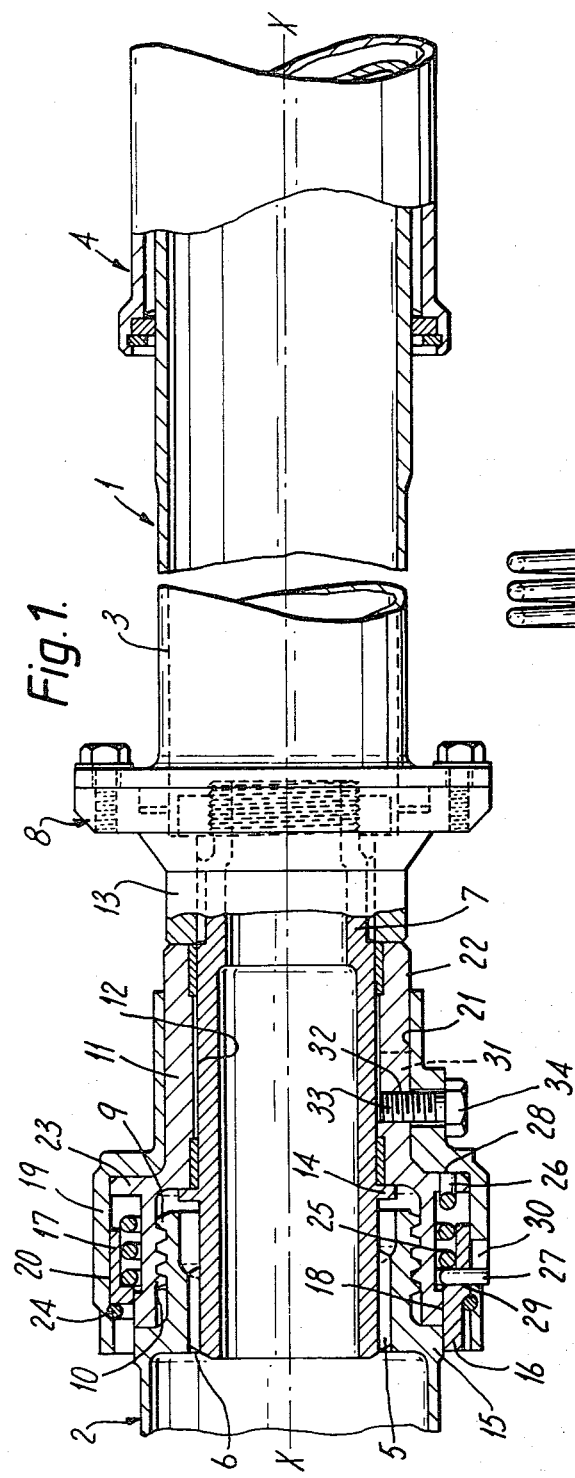
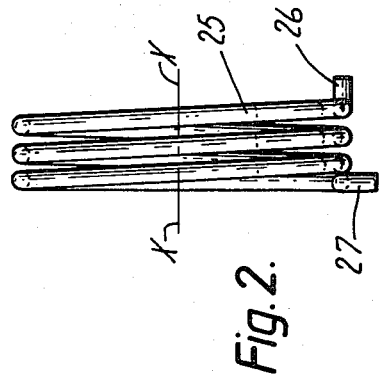

TORQUE SHAFT COUPLING

This invention relates to coupling means for two co-axial torque transmitting shafts.

It has for an objective the provision of coupling means which enable the shafts to be readily and quickly coupled and uncoupled by hand without tools, and which are readily rendered resistant to inadvertent uncoupling.

A further objective is the provision of such coupling means in which coupling, uncoupling, and the rendering of the coupled coupling resistant to inadvertent uncoupling is achievable by hand movement of a single member, for example a single external readily grippable housing.

According to the present invention coupling means for two co-axial torque transmitting shafts include separable torque transmitting joint means capable of sliding axial movement into or out of a torque transmitting condition, axial movement effecting means for axially urging said joint means into or out of torque transmitting engagement by rotational movement, rotational movement preventing means capable of axial movement into or out of a locking condition preventing rotational movement of said axial movement effecting means, and detent means for preventing inadvertent axial movement of the rotational movement preventing means out of the locking condition.

Preferably the coupling means also includes a sheath-like housing capable of being gripped by hand for both rotational and axial movement, the housing being operatively associated with the detent means such that limited rotational movement places the detent means into a condition in which axial movement of the housing is allowed or prevented, with the rotational movement preventing means such that axial movement of the housing axially moves the preventing means into or out of the locking condition, and with the axial movement effecting means such that when the rotational movement preventing means is out of the locking condition, the rotation of the housing effects the drawing of the joint means into or out of torque transmitting engagement.

In this case, the torque transmitting joint means conveniently include mutually engageable male and female splined regions, one formed upon each shaft assembly to be coupled.

Preferably, the axial movement effecting means include a sleeve concentrically carried by one shaft assembly location means for preventing axial movement of the sleeve but allowing rotation with respect to its shaft assembly, mutually engageable screw threaded regions formed one upon the sleeve and the other upon the non sleeve carrying shaft assembly and connecting means connecting the sleeve with the housing, so that rotation of the housing causes the sleeve to screw or unscrew the screw threaded regions and draw the splined regions of the torque transmitting joint means axially together or apart.

Preferably, the rotational movement preventing means include a fixed interference surface formed upon the non-sleeve carrying shaft assembly, and an interference member carried by the housing for axial movement therewith into and out of a mutual interference locking condition with the fixed interference surface.

Preferably, the detent means include mutually cooperating shoulder and peg means, one associated with the sleeve and the other with the housing, the shoulder means having a region which when engaged by the peg means prevents relative axial movement of the sleeve and the housing but allows limited relative rotational movement and a further region which allows relative axial movement but prevents relative rotational movement.

Figure 4:
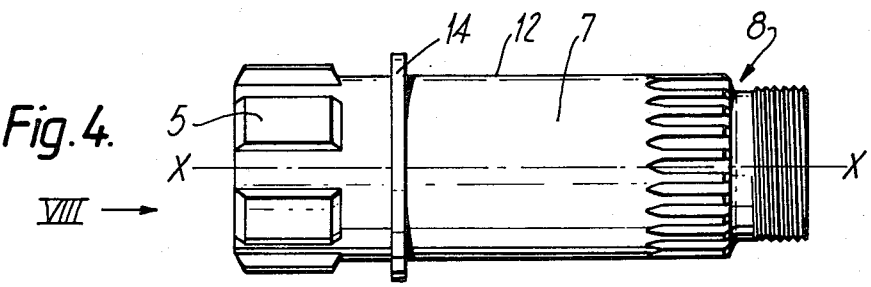
Figure 5:
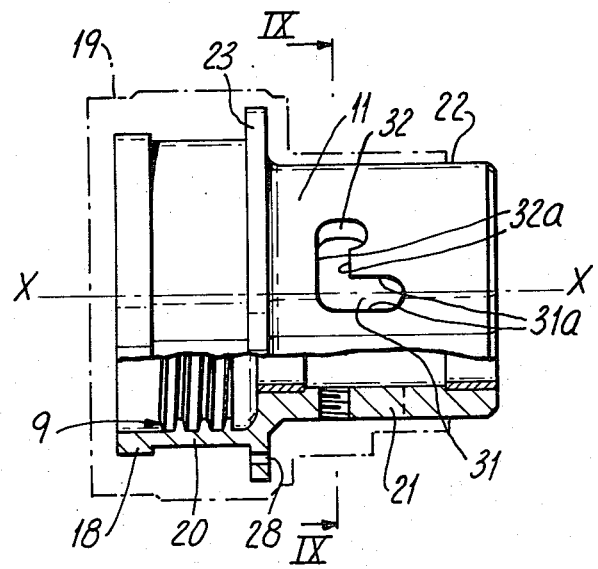
Figure 6:
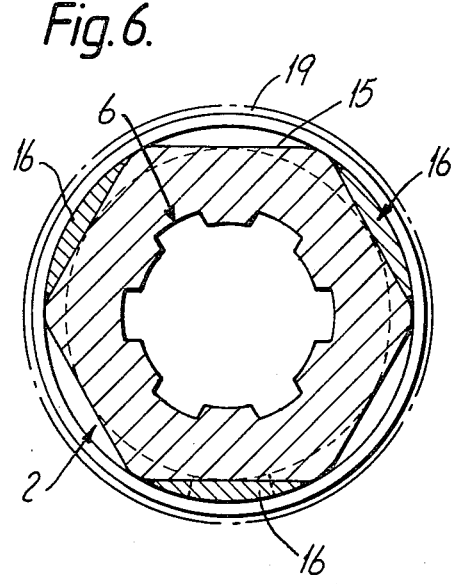
Figure 7:
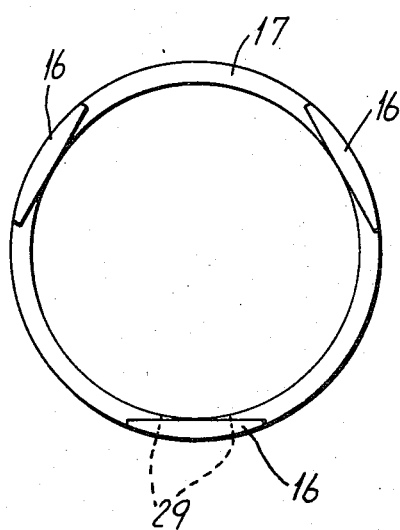
Figure 8:
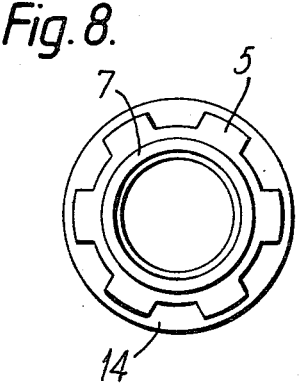
Figure 9:
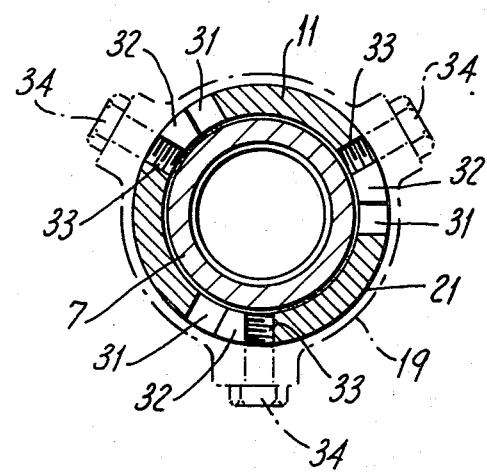

One preferred embodiment of coupling means according to the invention is described with reference to the accompanying drawings, in which:

FIG. 1 is a side elevation of a coupling means in a coupled torque transmitting condition, the elevation being partially cross-sectioned in a plane including a longitudinal axis of rotation X—X, FIGS. 2, 3, 4 and 5 illustrate various components, some partially sectioned for clarity, FIG. 6 is a cross section upon Arrows VI—VI of FIG. 3, FIG. 7 is an end view of just one component of FIG. 3, FIG. 8 is an end view of that component of FIG. 4, that is to say, a view upon Arrow VIII, and FIG. 9 is a cross sectional view upon Arrows IX—IX of FIG. 5.

In the drawings, two coaxial shaft assemblies 1 and 2 require to be releasably coupled to transmit torque from, say, an aircraft engine to ancillary equipment. The shaft assembly 1 is telescopic to allow its coupled end 3, to move relatively axially with reference to the shaft assembly 2 during coupling and uncoupling. This telescopic facility is provided in known manner by co-operating axially slidable splines shown for reference only at 4.

Coupling of the two shaft assemblies 1 and 2 is effected by four readily identifiable but associated features. As will be described, these features are associated with one another such that coupling and uncoupling can be carried out by moving, in particular ways, just one member. Naturally, this member is configured to be readily grasped by the hand for such movement to be effected.

One feature is a separable torque transmitting joint. This comprises a male splined region 5 and a female splined region 6 which regions are mutually slidably engageable one with the other to provide torque transmission. The region 5 is conveniently formed upon a nose member 7 of reduced diameter fixedly coaxially attached to the coupled end 3 of the shaft assembly 1. The attachment arrangement for the nose member 7 is shown for reference at 8. Additionally to being shown in FIG. 1, the nose member 7 is discretely illustrated in FIGS. 4 and 8. The female splined region 6 is formed upon a reduced diameter end of the shaft assembly 2.

A second feature is an axial movement effecting screw for effecting slidable engagement of the male and female splined regions 5 and 6 respectively. This comprises a female screw threaded region 9 and a male screw threaded region 10 which are screwed together to draw the splined regions 5 and 6 into torque transmitting engagement and are unscrewed to draw the splined regions apart. For rapid screwing and unscrewing the thread is of the three-start variety.

The female screw threaded region 9 is formed upon a sleeve 11 which is concentrically rotatably carried upon a cylindrical bearing surface region 12 of the nose member 7. Whilst the sleeve 11 is readily rotatable, it is prevented from axial movement with respect to the nose member 7 by means of a collar 13 and an annular shoulder 14.

Rotation of the sleeve 11 to effect screwing or unscrewing and hence relative axial movement of the splined regions 5 and 6 is effected in a manner to be described.

The male screw threaded region 10 is formed upon the shaft assembly 2 concentrically with the female splined region 6.

A third feature is a releasable rotational movement preventing, that is to say, locking arrangement for the screw threaded regions 9 and 10. This comprises fixed interference surfaces 15, arranged as the flat surfaces of a hexagon formed upon the shaft assembly 2, together with three interference members 16 each shaped to lie against one of the flat surfaces 15 of the hexagon when in an interfering locking position. The three members are spaced to engage alternate surfaces of the hexagon.

The interference members 16 protrude axially from an annulus 17 which is axially slidably mounted on a bearing surface 18 formed upon the sleeve 11. Conveniently, the bearing surface 18 is of a diameter similar to that of that dimension measured transversely across opposing flat surfaces 15 of the hexagon. As can be seen in FIGS. 1 and 3, the annulus lies concentrically around the exterior of the sleeve 11; it is held in this position by an annular housing 19 which effectively encloses the assembled coupling.

The housing 19 is of sheath-like form; it can thus be readily grasped. It is by movement of this single member that coupling, uncoupling and rendering the coupled coupling resistant to inadvertent uncoupling is achieved. It has a portion 20 of relatively large internal diameter within which the annulus 17 lies; the annulus is effectively trapped in the radial sense between the surface 18 of the sleeve 11 and the internal surface of the portion 20. It also has a portion 21 of relatively small internal diameter which is carried by a bearing surface 22 formed upon the exterior surface of the sleeve 11.

An annular flange 23 externally formed upon the sleeve 11 is arranged to protrude into the large diameter portion 20 of the housing to provide both an axial stop, preventing excessive axial movement of the housing toward the shaft assembly 2, and a radial location for the housing.

The annulus 17 is held relatively to the housing 19 in the axial sense by means of a circlip 24 and a coil spring 25. The coil spring 25 is compressed between the annulus 17 and the flange 23 so that the annulus 17 is biased axially towards its circlip. The coil spring is clearly illustrated in FIG. 2; it is formed with an axial protrusion 26 at its end which abuts the flange 23 and a radial protrusion 27 at its end which abuts the annulus 17. The axial protrusion 26 is accepted by an axial hole 28 in the flange 23 whilst the radial protrusion 27 is accepted by a radial hole 29 in the annulus. Furthermore, the radial protrusion 27 is accepted by a radially formed axially elongate slot 30 formed in the housing 19.

The radial hole 29 is of a width when viewed along the axis X—X to allow limited rotation of the annulus 17 with reference to the housing 19. The slot 30 allows relative axial movement between the annulus and the housing but no rotation.

The spring, since it is effectively compressed between the sleeve 11 and the housing 19, is conveniently used to bias the housing in the axial sense, together with its carried annulus 17, towards the interfering locking position of members 16 with the surfaces 15. Furthermore, since the spring is effectively anchored in torsion with respect to the sleeve 11 at one end and to the housing 19 at the other, it conveniently is used to bias the housing 9 in a rotational sense with reference to the sleeve 11.

A fourth feature is a detent arrangement for preventing inadvertent axial movement of the rotational movement preventing means out of the locking condition. This comprises three equally angularly spaced slots formed in the bearing surface 22 of the sleeve 11. Each slot has an axially extending part 31 and a circumferentially extending part 32. Both parts of each slot are of a width to slidably accommodate a spigot 33, that is to say, a peg, formed on an inwardly radially directed screw 34 associated with each slot and carried by the housing 19. Naturally, the screws 34 are equally angularly spaced upon the housing.

The combined effect of the bias of the spring 25 in the two senses described earlier is to urge each spigot 33 along that axial slot part 31 toward that circumferential slot part 32, and, when that circumferential part 32 is reached, to cause the spigot 33 to be urged to the extremity thereof. When each spigot 33 is in the axial part 31 of the slot, shoulders 31a thereof prevent rotation of the housing, whilst, when each spigot 33 is in the circumferential part 32 of the slot, the shoulders 32a thereof prevent axial movement of the housing.

Since the screws 34, together with their spigots 33, radially interconnect the housing 19 and the sleeve 11 rotation of the housing effects screwing or unscrewing rotation of the sleeve.

In use, the coupling means operates as follows. It will be recalled that the coupling of the two shaft assemblies 1 and 2 is primarily by sliding that splined region referenced 5 into that referenced 6; the further operations are purely secondary to this. The shaft assembly 1 is telescopic to allow this sliding movement.

The sliding movement is effected by grasping the housing 19, rotating it through a limited angular amount against the torsional bias of the spring 25 until the spigots 33 move from their circumferential slot parts 32 into their axial slot parts 31, and then drawing the housing 19 axially against the axial bias of spring 25 away from the shaft assembly 2. The splined regions 5 and 6 are then aligned for slidable engagement and the screw threaded regions 9 and 10 screwed together by rotating the housing 19 which in turn rotates the sleeve 11 by virtue of the screws 34.

Subsequently, when the splined regions 5 and 6 are in full torque transmitting engagement, that is to say, when the screw threaded regions 9 and 10 are screwed up to their fullest extent, the housing 19 is released which allows the axial spring bias to urge it towards the shaft assembly 2 until the interference members 16 each lie against one of the flat surfaces 15 of that hexagon formed upon the shaft assembly 2. Some minor to and fro rotational movement of the housing may be necessary to provide the alignment of the members 16 with the surfaces 15 to allow initial engagement; full engagement follows under the axial urging of the compressed spring 25.

Finally, when the members 16 are in full, relative rotation preventing engagement with the flat surfaces 15, the spigots 33 have moved axially along the axial slot parts 31 to become aligned with the circumferential parts 32 of the slots. Under the torsional bias of the spring 25 they are urged therein to be prevented from further axial movement by the shoulders 32a. Axial movement for initiating uncoupling is only achievable when the housing 19 is grasped and rotated through a small angle against the bias of the spring 25, so that the housing can be drawn away axially from the shaft assembly 2. To allow this initial rotation of the housing 19, despite the rotation preventing interference of the members 16 and the surfaces 15, it will be recalled that the radial hole 29 is of extra width to allow limited lateral movement of the spring protrusion 27 which allows relative movement in the rotational sense between the annulus 17 and its housing 19.

I claim:

1. Coupling means for two coaxial torque transmitting shafts including:
   torque transmitting joint means capable of sliding axial movement into and out of a torque transmitting condition, relatively rotatable means for effecting said sliding axial movement of said joint means upon relative rotation of said rotatable means,
   means for preventing said rotational movement, said preventing means being axially movable into and out of a locking condition wherein, when in said locking condition, rotatable movement of said relatively rotatable means is prevented,
   detent means for preventing inadvertent axial movement of said relatively rotatable means from the said locked condition,
   said coupling means further including a housing member capable of both rotational and axial movement, said housing member being operatively associated with said detent means such that limited rotational movement of said housing member places said detent means into a condition in which axial movement of said housing member is allowed or prevented, with said means for preventing said rotational movement so that axial movement of said housing member axially moves said means for preventing said rotational movement into or out of said locking condition, and with said relatively rotatable means for effecting said sliding axial movement such that, when said means for preventing said rotational movement is out of the locking condition, rotation of said housing member effects the drawing of said joint means into or out of the torque transmitting condition.

2. Coupling means as claimed in claim 9 wherein said housing member is capable of being gripped by hand for both said rotational and axial movement.

3. Coupling means according to claim 1 wherein the torque transmitting joint means include mutually engageable male and female splined regions, one formed upon each shaft.

4. The coupling means as claimed in claim 3 wherein said relatively rotatable means for effecting said sliding axial movement includes a sleeve concentrically carried by one shaft assembly, means for preventing axial movement of said sleeve but allowing rotation with respect to its shaft assembly, mutually engageable screw threaded regions formed one upon said sleeve and upon the non-sleeve carrying shaft assembly, and connecting means connecting said sleeve with said housing so that rotation of said housing causes said sleeve to screw or unscrew the screw threaded regions and draw the said splined regions of said torque transmitting joint means axially together or apart.

5. Coupling means according to claim 4 wherein the detent means include mutually co-operating shoulder and peg means, one associated with the sleeve and the other with the housing, the shoulder means having a region which when engaged by the peg means prevents relative axial movement of the sleeve and the housing but allows limited relative rotational movement, and a further region which allows relative axial movement but prevents relative rotational movement.

6. Coupling means according to claim 5 including biasing means for biasing the housing in a rotational sense towards a position in which relative axial movement between the sleeve and the housing is prevented.

7. Coupling means according to claim 3 wherein the means for preventing said rotational movement include a fixed interference surface formed upon the non sleeve carrying housing for axial movement therewith into or out of a mutual interference locking condition with the fixed interference surface.

8. Coupling means according to claim 7 including biasing means for axially biasing the housing towards a position in which the interference surface and the interference member are in the mutual interference locking condition.

* * * * *